United States Patent
Davis et al.

(10) Patent No.: US 12,475,608 B2
(45) Date of Patent: Nov. 18, 2025

(54) GENERATING IMAGES OF SYNTHESIZED BODIES WEARING A GARMENT

(71) Applicant: Amazon Technologies, Inc., Seattle, WA (US)

(72) Inventors: Larry Davis, Brooklyn, NY (US); Nicolas Heron, New York, NY (US); Amit Kumar Agrawal, Santa Clara, CA (US); Nina Mitra Khosrowsalafi, Austin, TX (US); Osama Makansi, Nufringen (DE); Oleksandr Vorobiov, Albstadt (DE)

(73) Assignee: Amazon Technologies, Inc., Seattle, WA (US)

( * ) Notice: Subject to any disclaimer, the term of this patent is extended or adjusted under 35 U.S.C. 154(b) by 280 days.

(21) Appl. No.: 18/194,441

(22) Filed: Mar. 31, 2023

(65) Prior Publication Data
US 2024/0331211 A1 Oct. 3, 2024

(51) Int. Cl.
*G06T 11/00* (2006.01)
*G06T 7/12* (2017.01)
(Continued)

(52) U.S. Cl.
CPC ............... *G06T 11/00* (2013.01); *G06T 7/12* (2017.01); *G06T 7/70* (2017.01); *G06V 10/764* (2022.01);
(Continued)

(58) Field of Classification Search
None
See application file for complete search history.

(56) References Cited

U.S. PATENT DOCUMENTS

2019/0371080 A1* 12/2019 Sminchisescu ......... G06T 17/20

OTHER PUBLICATIONS

Christoph Lassner, A Generative Model of People in Clothing, 2017 IEEE International Conference on Computer Vision (ICCV), Online Oct. 1, 2017, pp. 853-862, XP093162091, DOI : 10 . 1109/ICCV. 2017.98, ISBN: 978-1-5386-1032-9, Retrieved from the Internet : URL : https : //ieeexplore.ieee.org/stampPDF/getPDF.jsp?tp= &arnumber=8237360&ref= aHR0cHM6Ly93d3cuZ29vZ2xlLmNvbS8=> [retrieved on May 14, 2024].

(Continued)

*Primary Examiner* — Yanna Wu
(74) *Attorney, Agent, or Firm* — Knobbe, Martens, Olson & Bear, LLP

(57) ABSTRACT

Systems and methods are described for generating images of synthesized bodies wearing a garment. For instance, a source image of a human or mannequin wearing a garment may be submitted to a synthesized human generation system. In response to receiving the source image, the synthesized human generation system may use a classifier to classify the image as depicting one or more body types or orientations. The synthesized human generation system may also apply segmentation to the source image to segment the garment pixels. The synthesized human generation system may then select one or more body generation machine learning models based on the classification of the source image. The synthesized human generation system may utilize the selected machine learning models to generate one or more output images of synthesized bodies that appear to be wearing the garment, using the segmented garment as input.

20 Claims, 5 Drawing Sheets

(51) Int. Cl.
*G06T 7/70* (2017.01)
*G06V 10/764* (2022.01)

(52) U.S. Cl.
CPC .............. *G06T 2207/20081* (2013.01); *G06T 2207/30196* (2013.01)

(56) References Cited

OTHER PUBLICATIONS

Mihai Zanfir et al: Human Appearance Transfer, 2018 IFFF/CVF Conference on Computer Vision and Pattern Recognition, IEEE Jun. 18, 2018, pp. 5391-5399, XP033473452, DOI: 10.1109/CVPR.2018.00565 [retrieved on Dec. 14, 2018].

Naiyu Fang et al: Toward Multi-Category Garments Virtual Try-On Method by Coarse to Fine TPS Deformation, Neural Computing and Applications, Mar. 25, 2022, vol. 34 No. 15, pp. 12947-12965, XP037909942, ISSN: 0941-0643, DOI: 10.1007/S00521-022-07173-Springe-Verlag London Ltd, London [retrieved on Mar. 25, 2022].

\* cited by examiner

GENERATING IMAGES OF SYNTHESIZED BODIES WEARING A GARMENT

BACKGROUND

Photographs and information regarding garments or clothing items can be published to a website promoting the sale of such garments. These websites may offer a customer different images of the garment in order for them to get a sense of size, fit, and finish, among other things, related to the garment, such that the customer may make a purchasing decision based on the images. Some customers prefer to see the garments worn by actual human models in order for these customers to make a purchasing decision. In order to satisfy the demands of these customers, photographers and human models may be hired in order to produce professional looking images of the models wearing the garment. Traditional methods for producing such images often involve considerable effort and expense associated with a professional photographer, a human model, professional lighting, physically delivering the garment to a studio or other location for photography, etc.

BRIEF DESCRIPTION OF THE DRAWINGS

Embodiments of various inventive features will now be described with reference to the following drawings. The drawings are provided to illustrate example embodiments described herein and are not intended to limit the scope of the disclosure.

DETAILED DESCRIPTION

Figure 1:
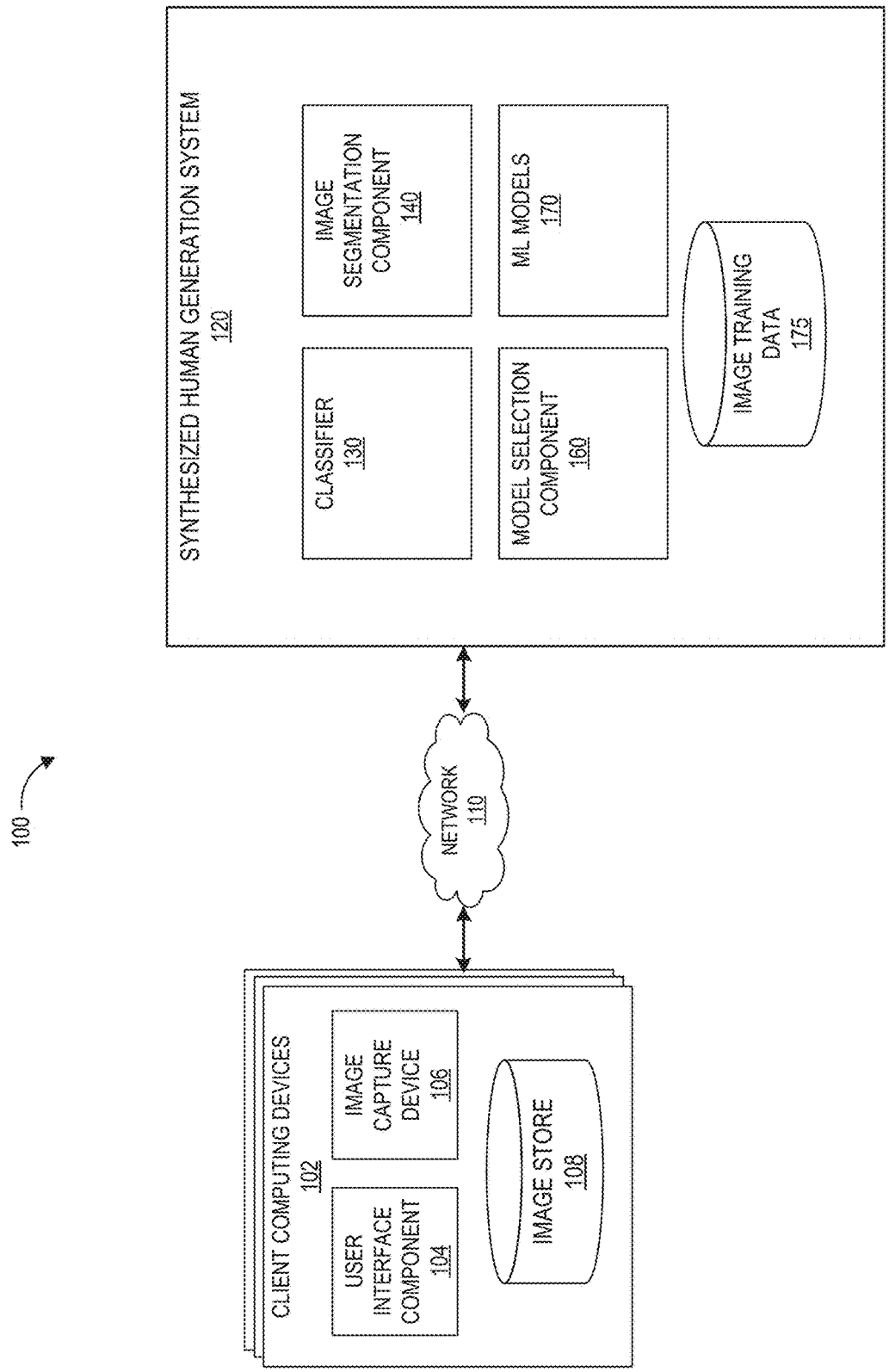
FIG. 1 depicts an example computing environment including a synthesized human generation system via which embodiments of the present disclosure can be implemented.

Generally, aspects of the present disclosure relate to generating images of synthesized human bodies wearing a garment based on an input photograph of the garment. Websites that have garments and other clothing items for sale on them can have images of those garments on these websites. These images can allow for customers to have an experience of the garment in lieu of seeing it and trying it on in person. Some customers prefer to see images of garments being worn by professional human models prior to making a purchasing regarding those garments. Therefore, people or entities maintaining these websites may seek to hire professional photographers and humans to wear the garments in order to get professionally looking images of humans wearing garments. Such services come with disadvantages. Professional photographers and human models charge fees for their services which may be cost prohibitive for some people or entities running websites on a budget. Moreover, even if cost is not an issue, the time it takes for professional looking photos to be produced may not line up with the schedules of those who maintain websites with garments. For example, the schedules of both the photographers and the human models must be managed in order for a photo shoot with the photographers, human models, and the garments to take place. In addition, the garments themselves may have to be shipped to a photographer who may not be able to retrieve the garment physically beforehand, which adds more time to producing images.

In view of the above factors, some websites are left with images of garments without human models wearing them, or images of garments with models that don't appear professional due to a number of factors (e.g., bad equipment, bad lighting, bad angles, etc.). Moreover, amateur editing of an image of a garment may result in the garment appearing deformed, disfigured, or otherwise unappealing to customers. As disclosed herein, embodiments of this disclosure address at least these issues by providing a synthesized human generation system that can generate images of synthesized bodies wearing a garment without the need for professional photographers or professional human models.

As will be appreciated by one of skill in the art in light of the present disclosure, embodiments disclosed herein improve the ability of computing systems, such as cloud-hosted computing systems, to generate images of synthesized bodies wearing a garment using machine learning models. Moreover, the presently disclosed embodiments address technical problems inherent within such computing systems, such as addressing the difficulties in providing images of humans wearing garments that look professional without the need for photographers and humans, and also producing images in a quick and efficient manner without the scheduling and time constraints of outside parties (photographers, humans to wear the garments, etc.). These technical problems are addressed in various manners described herein including a synthesized human generation system which receives one or more source images of a garment being worn by a human or mannequin and using different components to generate one or more images of synthesized bodies wearing the garment. The synthesized human generation system can classify the source image(s) as depicting one or more body types or orientations (such as a female, standing up, facing forward, etc.). Moreover, the synthesized human generation system can segment out the pixels of the garment from the source image(s). Using the classification of the source image(s), the synthesized human generation system can select one or more machine learning models, such as a particular machine learning model that has been previously trained to generate images of synthesized bodies of the type, orientation and/or other classification determined from a source image in the given instance. The synthesized human generation system may then use the selected machine learning models with the segmented garment as input, and generate one or more images of synthesized bodies wearing the garment. As such, these images may be generated without photographers or humans required to wear the garment and therefore result in cost savings and time savings. Thus, the present disclosure represents an improvement on computing systems in general.

The foregoing aspects and many of the attendant advantages of this disclosure will become more readily appreciated as the same become better understood by reference to the following description, when taken in conjunction with the accompanying drawings.

FIG. 1 depicts an example computing environment 100 including a synthesized human generation system 120 in which embodiments of the present disclosure can be implemented. Illustratively, the synthesized human generation system 120 can represent a network-accessible system for generating images depicting synthesized human bodies for a garment (e.g., a synthesized human body which wears the garment) after receiving one or more source images depicting the garment, without the requirement of photographers or human models. For example, the source image may be a photograph of the garment as worn by a mannequin or by any human, according to some embodiments.

The synthesized human generation system 120 can illustratively be accessed by client computing devices 102 over a network 110. The network 110 can include any appropriate network, including an intranet, the Internet, a cellular network, a local area network or any other such network or combination thereof. In FIG. 1, the network 110 is the Internet. Protocols and components for communicating via the Internet or any of the other aforementioned types of communication networks are known to those skilled in the art of computer communications and thus, need not be described in more detail herein.

Client computing devices 102 can include any network-equipped computing device, for example desktop computers, laptops, smartphones, tablets, e-readers, set top boxes, virtual reality headsets, gaming consoles, and the like. The client computing devices 102 illustratively include a user interface component 104 for accessing the synthesized human generation system 120. In one embodiment, the interface user component 104 represents or is provided by an application executing on the devices 102, such as a native application provided by an operator of the synthesized human generation system 120 or a web browser application (e.g., rendering a web page provided by the synthesized human generation system 120). The client device 102 as illustrated further includes an image capture device 106 (e.g., a camera), which is configured to enable capturing of digital photographs or images including humans or mannequins wearing a garment, or the like. While shown as including an image capture device 106, in some instances a client computing device 102 may exclude an image capture device 106 and may submit to the synthesized human generation system 120 source images otherwise acquired on the device 102 (e.g., by reading such an image from a memory card inserted into the client computing device 102, from local storage, from remote cloud storage, etc.) or selected from an existing electronic catalog or other repository associated with a retailer, garment manufacturer, garment distributor, or other party. The client device 102 further includes an image store 108, which represents a persistent or substantially persistent data store, such as solid state memory, a disk drive, or the like. The image store 108 illustratively includes one or more source images depicting one or more garments for which a user of the client computing device 102 desires to create an associated output image as described herein.

In accordance with embodiments of the present disclosure, a user of the client computing device 102 can interact with the synthesized human generation system 120 over the network 110 in order for the system 120 to generate one or more images each depicting a synthesized human body that appears to be wearing a given input garment. For example, the user interface component 104 may provide an interface that may allow a user of device 102 the ability to perform many actions. For example, the user interface component 104 may provide the user of the device 102 the ability to input appearance criteria for synthesized bodies to be generated by the synthesized human generation system 120 such as, but not limited to, skin tone, hair type, hair length, hair color, body build, male gender, female gender, facial features, facial hair, color of facial hair, and/or others. Other non-limiting input criteria may include desired positioning of the arms, hands, legs, or feet (e.g., legs crossed, arms crossed, thumbs up, etc.). Furthermore, the interface may allow the user to input accessories not a part of the garment for the synthesized human generation system 120 to visually integrate on the synthesized bodies or the garment in an output image, such as, but not limited to, bracelets, watches, shoes, hats, rings, socks, necklaces, belts, suspenders, etc. Moreover, the interface may allow the device 102 to submit image(s) of a human or mannequin wearing the garment to the synthesized human generation system 120. Accordingly, the device 102 may submit a source image (e.g., of a human wearing the garment in a certain body orientation, such as front facing, neck to toe, etc.) to the synthesized human generation system 120 and obtain, in response, images of one or more synthesized bodies wearing the garment.

As noted above, the synthesized human generation system 120 can support generation of images of synthesized bodies wearing the garment. The synthesized human generation system 120 illustratively includes a classifier 130, an image segmentation component 140, a model selection component 160, machine learning (ML) models 170, and a data store 175 storing image training data. The classifier 130 can classify the source image(s) according to one or more body types or orientations (e.g., front facing, head to toe, woman, man, etc.). The image segmentation component 140 can apply segmentation to the source image(s) to generate a segmented image of a garment, separated from a human or mannequin which may have originally worn the garment from the source image(s) (e.g., the initial photograph of a human or mannequin wearing the garment which is received by the synthesized human generation system 120 from the client computing device 102). The model selection component 160 may select ML models based on the body type or orientation classifications and/or user inputs (e.g., user preferences described above). The ML models 170, once selected by the model selection component 160, can receive the segmented image(s) as input, and generate image(s) of synthesized bodies wearing the garment. The ML models 170 can be trained using the image training data 175. Accordingly, the client computing device 102 (e.g., via the user interface component 104) can interact with the synthesized human generation system 120 to submit source images and obtain output images of synthesized bodies wearing the garment.

As stated above, the synthesized human generation system 120 can utilize the classifier 130 to classify images according to at least one or more body types or orientations. For example, the synthesized human generation system 120 may receive the source image(s) from the client computing device 102 where the source image(s) depict humans or mannequins wearing the garment in different poses, positions, and/or the like. The synthesized human generation system 120 can then utilize the classifier 130 to determine specific body types or orientations associated with the source image(s), such as, but not limited to, front facing (FF), side facing (SF), back facing (BF), head to toe (H2T), head to waist (H2W), head to knee (HTK), waist to toe (W2T), neck to toe (N2T), neck to knee (NTK), etc. It will be appreciated that the classifier 130 may be any of a variety of types of machine learning models, such as a convolutional neural network, that has been trained to classify input images based on labelled training data (e.g., training images of a variety of humans and/or mannequins wearing various clothing, in various poses and lighting conditions). As such, if the client computing device 102 submits to the synthesized human generation system 120 a first image depicting a front side of a mannequin from waist to toe, the first image may be categorized as front facing and waist to toe, of an unknown gender. Moreover, if the client computing device 102 submits to the synthesized human generation system 120 a second image depicting a side profile of a male human from head to toe, the second image may be categorized as side facing male from head to toe.

It should be noted that the classifier 130 may classify images according to more than body types and orientations, and/or a component other than a classifier may extract metadata that can be used to identify pose, body orientation and/or other visual attributes of an input image. For example, classifier 130 or another component may classify images based in part on 2D key points, segmentations, or red, green, blue (RGB) color values. If using 2D key points, the system may identify the location of the main body joints (e.g., left wrist, right shoulder, left ankle, etc.) as well as some facial landmarks (e.g., left eye, nose tip, right ear, etc.) and classify these images accordingly. These 2D key points may be obtained from a ML model (e.g., an MMPose model). If using segmentations, the classifier 130 may identify, from images, complete or partial contours (e.g., segmentations) of certain body parts, that inform the pose of the generated body. These segmentations may be obtained from a semantic segmentation model (e.g., an ML model that is trained). Also, if using RGB color values, the classifier 130 may classify images by identifying from images, or receiving, skin tones that may be used in the synthesized body generation such that the synthesized bodies share the skin tone identified and/or selected. The classifier 130 may be an ML model or other prediction system. Therefore, the classifier 130 can output body types or orientations based on source image(s) it received in a given instance.

The synthesized human generation system 120 can utilize the image segmentation component 140 to apply segmentation to each source image to separate garment pixels from the human or mannequin in the source image. For example, the synthesized human generation system 120 may receive a source image from the client computing device 102 where the source image (such as a photograph captured by a camera of the client computing device) depicts humans or mannequins wearing a garment in different poses, positions, and/or the like. The synthesized human generation system 120 can then utilize the image segmentation component 140 to separate the garment pixels from the human or the mannequin pixels, such that the resulting segmented image depicts the garment alone (e.g., only includes pixels of the garment without pixels depicting a mannequin, human skin, human hair, background of the photograph, etc.).

The image segmentation component 140 can save the segmented image(s) of the garment for use by other components of the synthesized human generation system 120, such as the ML models 170, discussed in more detail below. The image segmentation component 140 may be an ML model or other prediction system. Therefore, the image segmentation component 140 can generate segmented image(s) of a garment (e.g., while keeping the pixels of the garment) from the source image(s). It should be noted that the synthesized human generation system 120 may provide the option to keep the pixels of the garment from the source image(s) when generating the segmented images which may result in the image(s) produced by the ML models 170 having the garment appearance unchanged when worn by a synthesized body when compared to the source image(s). However, it should also be noted that that the synthesized human generation system 120 may provide the option to alter the pixels of the garment from the source image(s) (when at least generating the segmented images) which may result in the image(s) produced by the ML models 170 having the ability to allow body types or orientations which would not be allowed had the pixels of the source image(s) remained in intact (e.g., source image(s) show garment on a medium build man but option is selected for an extra-large build synthetic man to wear the garment).

The synthesized human generation system 120 can take classified body types or orientations and utilize the model selection component 160 to determine which machine learning model(s) of the ML models 170 should be used to generate images of synthesized bodies wearing the garment. For example, the synthesized human generation system 120 or the classifier 130 may send to the model selection component 160 a classification of a front facing, neck to toe, body orientation. In this example, the model selection component 160 may select a ML model that is designed to generate a front facing, neck to toe, synthesized body. As an additional example, the synthesized human generation system 120 or the classifier 130 may send to the model selection component 160 a classification of a side facing female, neck to knee, body type or orientation. In this example, the model selection component 160 may select a ML model that is designed to generate a side facing female, neck to knee, synthesized body. Additionally or alternatively, input from a user of the device 102 may also dictate which machine learning models of the ML models 170 are selected by the model selection component 160. For example, if the classifier 130 classified the body type or orientation as a front facing, neck to toe, male but the user wants a woman to wear the garment, then the synthesized human generation system 120 may alter the selected machine learning model to generate a synthesized front facing female, neck to toe, body instead of a male one.

Furthermore, once the model selection component 160 selects the machine learning models, the synthesized human generation system 120 can utilize the ML models 170 to generate one or more images of synthesized bodies wearing the garment, where the ML models 170 can receive the segmented garment image(s) as input. For example, a certain machine learning model of the ML models 170 (e.g., front facing male, neck to waist) may receive and/or retrieve segmented garment image(s) from the synthesized human generation system 120 or the model selection component 160. As such, the front facing male, neck to waist machine learning model of the ML models 170 may utilize the segmented garment image(s) to generate image(s) of synthesized bodies wearing the garment, in this case, the synthesized body of a front facing male, from the neck to waist, that can fit and/or wear the segmented garment image(s). As another example, the model selection component 160 may have selected a back facing woman, waist to toe, machine learning model of the ML models 170 to generate synthesized bodies and receive as input the segmented image(s) of a garment (e.g., a dress), and then generated image(s) of synthesized back facing woman, from the waist to toe, wearing the segmented garment image(s) (e.g. the dress). These image(s) may be utilized by a user of the client device 102 on a website where the user is selling the garment at least via the website.

The ML models 170 can generate image data depicting the body parts for the synthesized body based at least on the classification and/or human input. For example, the ML models 170 may generate a synthetic body from a front facing male, neck to toe classification and still have options to position the hands, arms, legs, and feet. Therefore, the ML models 170 may take into account user input to generate certain body parts of the synthesized body. As such, regarding the example above, user input my cause the ML models 170 to generate a synthesized body of a front facing male, neck to toe, with the arms and hands in a certain position based on user input (user input of arms crossed so the arms of the synthesized body are crossed) and the legs and feet in another position or orientation (e.g., legs straight and not crossed with toes pointing forward).

Moreover, the ML models 170 can control how add-ons or accessories appear with respect to the garment or synthesized body. For example, user input preferences may indicate that accessories such as belts and suspenders should be overlayed over the garment and person, therefore, the ML models 170 may generate image data depicting such add-ons or accessories over or on top of the garment. Additionally or alternatively, the ML models 170 may add or request from a user whether certain accessories or add-ons should be added to the synthesized body wearing the garment. For example, if the garment is a dress and the synthesized body is a front facing, neck to toe female, the ML models 170 may generate shoes that can be matched to the dress or ask a user whether shoes which match the dress should be added (which could similarly apply to hands and watches, waists and belts, necks and necklaces, etc.).

As described herein, the ML models 170 can include a plurality of machine learning models to generate images of synthetic bodies wearing the garment (e.g., the garments listed in the examples above). For example, there may be a machine learning model of the ML models 170 for every classification for which the classifier 130 has been trained. In other words, if the segmented garment image(s) are for a side facing, neck to waist, body orientation, then the model selection component 160 may select a machine learning model specifically used to generate synthesized bodies with a side facing, neck to waist, profile that wears the segmented garment image(s). In other embodiments, a given machine learning model may be trained to generate images for any of multiple input image classifications, in which case such a machine learning model may receive the input image classification as an additional input to be considered in the model's image generation process. The ML models 170 can include any of a variety of types of machine learning models or machine learning algorithms, which may vary among different body types or orientations (e.g., front facing (FF), side facing (SF), back facing (BF), head to toe (H2T), head to waist (H2W), head to knee (HTK), waist to toe (W2T), neck to toe (N2T), neck to knee (NTK), etc.).

In various embodiments, the ML models 170 may be implemented via one or more specific machine learning algorithms. For example, the synthesized human generation system 120 may implement one or more of the ML models 170 as a generative adversarial network (GAN). If implemented as a GAN, a given ML model of the synthesized human generation system 120 may include a generator component and a discriminator component. The synthesized human generation system 120 may implement the generator by encoding one or more segmented garment image(s) using a fully convolutional neural network, which may return encoded features having different resolutions. The synthesized human generation system 120 may then combine those features with generator feature maps by concatenating them together over a channel dimension. The synthesized human generation system 120 may implement the generator using modulated convolutions, where the feature map values are modulated using a random latent vector. Both the generator and the discriminator can be trained simultaneously end-to-end. As such, this design may allow for propagating spatial information of the garment (e.g., keeping pixels of the garment from a source image identified by the image segmentation component 140) to one or more generated image(s) which include synthesized bodies wearing the garment. Several existing approaches can be utilized to reduce the segmented garment image(s) to a 512-dimensional vector, for example, and modify the latent vector. Some of these prior approaches reduce the spatial information and have challenges in preserving the spatial content like textures, text, logos, etc. The synthesized human generation system 120 may implement the discriminator to enforce the garment preservation on a pixel-by-pixel basis (e.g., keeping the pixels of the garment from the source image(s) in the segmented image(s) generated by the image segmentation component 140), by providing conditioning to the segmented image(s) together with source image(s) to the discriminator. In other words, the discriminator may compare the segmented image(s) with the source image(s) and determine if the segmented image(s) meet a threshold. If the segmented image(s) meet the threshold, the synthesized human generation system 120 may utilize them with the ML models 170 to generate one or more images of one or more synthesized bodies wearing the garment.

Additionally or alternatively, the synthesized human generation system 120 may implement one or more of the ML models 170 as a diffusion model. In some embodiments in which at least one of the ML models is implemented as a diffusion model, the synthesized human generation system 120 may implement the diffusion model in two stages. In the first stage, the synthesized human generation system 120 may implement the diffusion model with an asymmetric architecture with two encoders and a decoder. The synthesized human generation system 120 may implement the two encoders as a main encoder and a non-main encoder. The non-main encoder may generate garment features (e.g., with a garment from source image(s)) while the main encoder may take pixels of a source image corresponding to a human or mannequin without clothing. The synthesized human generation system 120 may pass the garment features from the encoder to the decoder at various levels to preserve spatial details of the garment (e.g., keep the pixels from the source image(s)). In the second stage, the synthesized human generation system 120 may train the diffusion model on latent space. The synthesized human generation system 120 may utilize the diffusion model to reason about the garment shape to denoise the human or mannequin's latent code that is compatible with the garment. Thus, the synthesized human generation system 120 may condition the second stage on garment features extracted from a learnable clothing encoder that takes the garment shape as input. Notably, this may be different from the clothing encoder of the first stage in: (1) the input may be the garment shape rather than the garment image since the shape of the garment not the garment texture details may be used, and (2) the objective may be to generate a synthesized human body that is compatible with the shape of the garment in the latent space. In contrast, the garment encoder in the first stage may be responsible for garment details and texture.

The synthesized human generation system 120 may further train the ML models 170 using the image training data 175. For example, the image training data 175 may include labelled images of humans, human bodies, human body types or orientations, garments, garment accessories, etc. Once the synthesized human generation system 120 has trained the ML models 170 using the image training data 175, these models may be used to generate images of synthesized bodies wearing a garment, which generally would include a garment (and associated image data depicting such garment) that was not part of the training data.

The synthesized human generation system 120 is depicted in FIG. 1 as operating in a distributed computing environment including several computer systems that are interconnected using one or more computer networks (not shown in FIG. 1). The synthesized human generation system 120 can alternatively operate within a computing environment having a fewer or greater number of devices than are illustrated in FIG. 1. Thus, the depiction of the synthesized human generation system 120 in FIG. 1 should be taken as illustrative and not limiting to the present disclosure. For example, the synthesized human generation system 120 or various constituents thereof could implement various Web services components, hosted or "cloud" computing environments, and/or peer to peer network configurations to implement at least a portion of the processes described herein. Moreover, the environment 100 may include additional elements not shown in FIG. 1.

Further, the synthesized human generation system 120 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a cloud computing environment.

Figure 2:
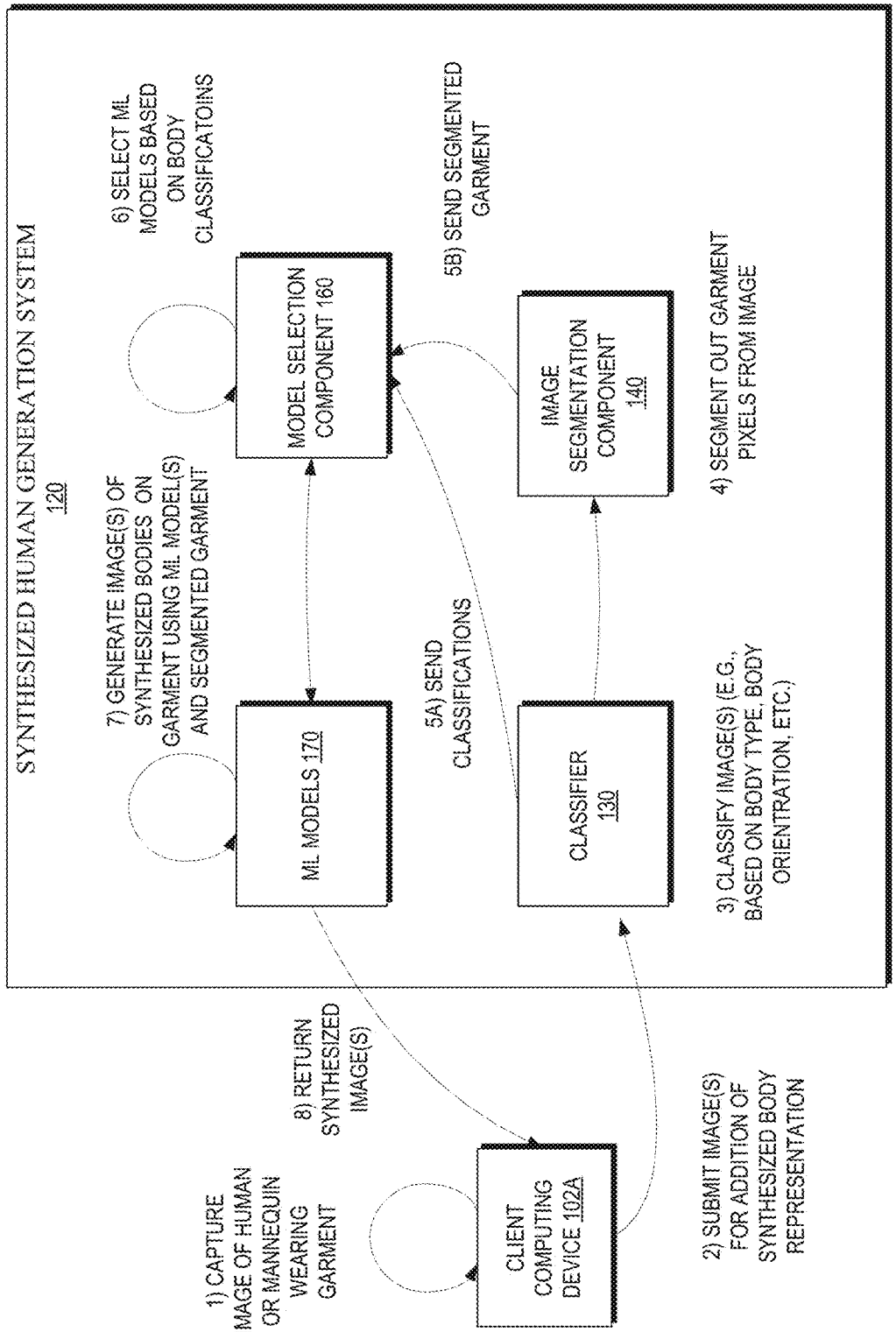
FIG. 2 is a block diagram depicting illustrative interactions for creation of one or more images of synthesized bodies wearing a garment from a source image, in accordance with embodiments of the present disclosure.

With reference to FIG. 2, illustrative interactions will be described for creation of image(s) of synthesized bodies wearing a garment from source image(s), in accordance with embodiments of the present disclosure. The interactions begin at (1), where a client computing device 102A captures source image(s) depicting a human or mannequin wearing a garment. For example, a user of the device 102A may capture a source image depicting a human subject, who is a woman, wearing a dress (garment) in a front facing manner. Moreover, as stated above, the device 102A may have received user input preferences concerning how the image(s) to be generated by the synthesized human generation system 120 should look, for example, a certain skin tone, hair type and hair color, among other user preferences.

At (2), the device 102A submits the source image(s) of the human or mannequin wearing the garment, to the synthesized human generation system 120 where the synthesized human generation system 120 sends the source image(s) to the classifier 130 for classification. As stated herein, the device 102A may present an interface where a user of that interface may have requested to submit source image(s) to the synthesized human generation system 120 for generation of synthetic bodies for the garment, which may include enabling a user to capture a photograph of the garment (as worn by the user, another person, or a mannequin) using a camera.

At (3), the classifier 130 receives the one or more source images and classifies each as depicting a certain body type and/or body orientation. For example, some of the source image(s) may be classified as a side facing woman, from waist to knee. In another example, some of the source image(s) may be classified as a front facing man, from neck to waist. As described below, these body types or orientations may be input into the model selection component 160 in order to determine which machine learning models of the ML models 170 may be used to generate synthesized bodies for the garment. In other embodiments, additional information about the garment may be utilized to identify the appropriate ML model and/or as additional input to the ML model, such as a browse node classification for the garment item in an electronic catalog or a garment type (e.g., a dress, a women's shirt, men's pants, etc.).

At (4), either the synthesized human generation system 120 or the classifier 130 may send the source image(s) to the image segmentation component 140 for segmentation of the garment. As described herein, the image segmentation component 140 can segment out the garment pixels from the source image(s) (e.g., the resulting segmented image(s) do not include the human or the mannequin, only the pixels from the source image that collectively depict the garment). By segmenting out the pixels of the garment, the synthesized human generation system 120 may keep intact the shape and figure of the garment from the source image(s) such that when the synthetic bodies appear to wear the garment in an output image, the garment appears similar or nearly identical in look to the source image.

At (5A), the synthesized human generation system 120 or the classifier 130 may send the classifications of body types or orientations to the model selection component 160. At (5B), the synthesized human generation system 120 or the image segmentation component 140 may send the segmented garment image(s) to the model selection component 160. At (6), the model selection component 160 receives the body types or orientations and the segmented garment image(s) and determines which ML models to use in order to generate images of one or more synthesized bodies wearing the garment.

At (7), the synthesized human generation system 120 utilizes the selected ML model(s) 170 from (6) to generate one or more images of one or more synthesized bodies wearing the garment. For example, the selected ML models 170 may take the segmented garment image(s) (e.g., image data depicting a photographed shirt) and then generate synthesized bodies in accordance with the classifications from 5A). In other words, a selected ML model may generate an image of a synthesized body having a body type and/or orientation (e.g., front facing man, neck to toe) wearing the segmented garment image (e.g., a synthesized front facing man from neck to toe, is wearing a t-shirt from the source image). At (8), the synthesized human generation system 120 sends the image(s) of the synthesized bodies wearing the garment to the client computing device 102A. As discussed above, in some embodiments, the ML model may be trained or configured to substantially maintain the pixels of the garment unchanged from the segmented input image, and may generate an image that includes those garment pixels in addition to synthesized body parts (as appropriate for the particular garment type, shape, orientation, etc.) generated based on those input garment pixels. For example, pixels depicting arms, legs, a neck, and/or a face may be generated by the selected ML model based in part on the shape and orientation of corresponding portions of the segmented garment (e.g., an arm may be generated based in part on the shape and size of the arm and shoulder portion of pixel data from an input shirt garment).

Accordingly, a client computing device 102A can, via the interactions shown in FIG. 2, provide a source image of a human or mannequin wearing a garment, to the synthesized human generation system 120, and be provided with one or more images that each depict a synthesized body wearing the garment (where the particular appearance of the synthesized body may vary between the different output images). The client device 102A may thereafter provide the image(s) of one or more synthesized bodies wearing the garment for display and/or publishing to various websites, among other actions.

Figure 3:
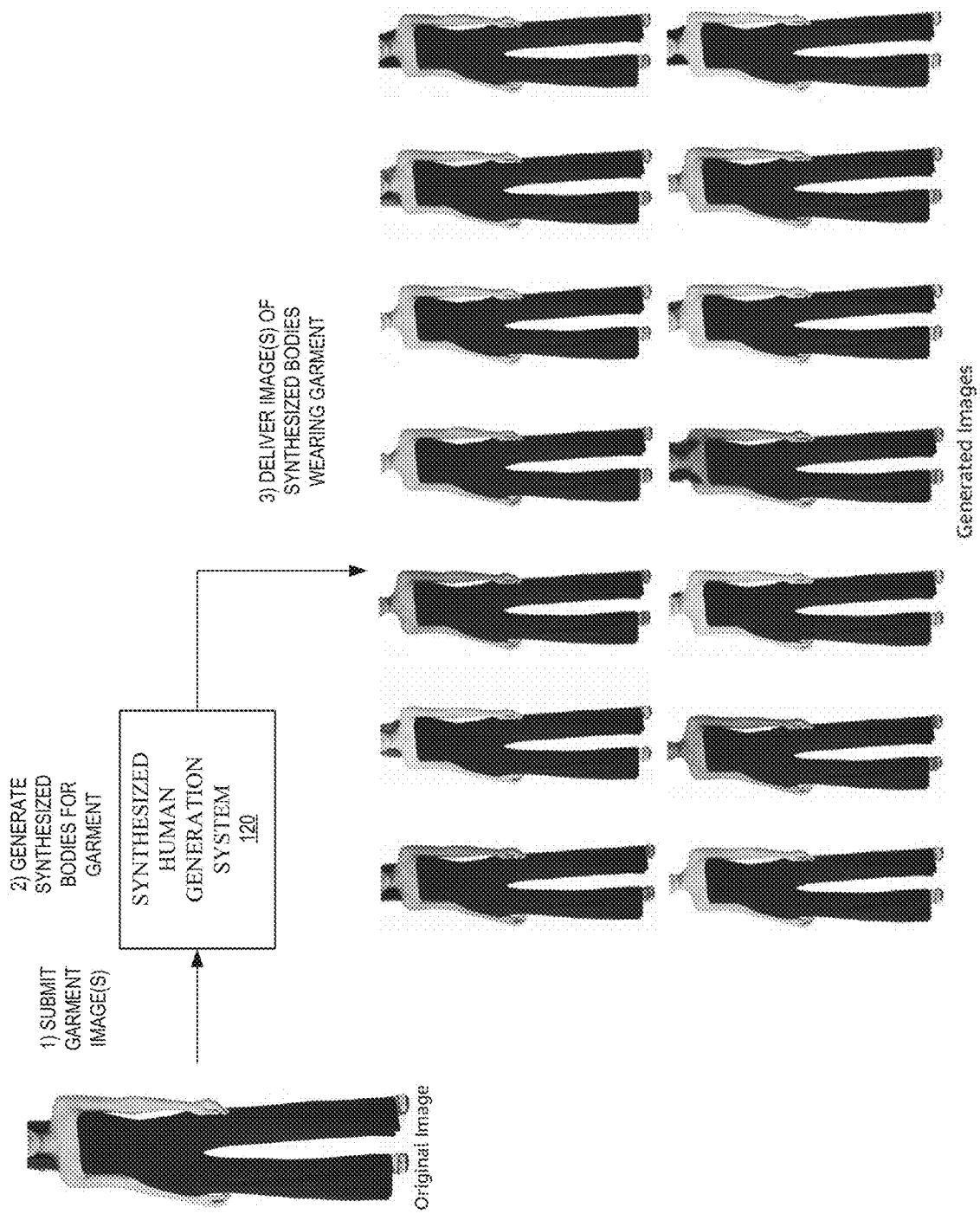
FIG. 3 is a block diagram that visually depicts a source image and corresponding generated images of synthesized bodies wearing a garment depicted in the source image.

FIG. 3 visually depicts a source image, the synthesized human generation system 120, and image(s) of synthesized bodies wearing a garment. As shown in FIG. 3, at (1), a source image is submitted to the synthesized human generation system 120. As shown at (1), the source image in this example depicts a front facing, neck to toe, woman wearing a garment. This original source image may have been captured by a camera as a real photograph of a real human wearing the garment.

At (2), the synthesized human generation system 120 receives the source image and generates images of synthesized bodies wearing the garment. As described above, the synthesized human generation system 120 may use different components to generate these images. For example, the classifier 130 may make classifications of the source image (e.g., front facing, neck to toe, woman). The image segmentation component 140 may segment out the garment pixels from the source image. The model selection component 160 may then select the ML model(s) from the ML models 170 to use based on the classification(s) and the segmented garment. After that, the selected ML models 170 may generate image(s) with synthetic bodies wearing the garment.

At (3), the synthesized human generation system 120 delivers the images of the synthetic bodies wearing the garment to a destination for publishing and/or display. As shown at (3), the synthesized bodies appear to be different women than the human that was photographed actually wearing the garment at (1). However, in this figure the garment is left unchanged (e.g., the garment is depicted using unaltered pixels from the source image). Therefore, the images with the synthesized bodies may be used in place of real professional human models wearing the garment for purposes such as publishing on an e-commerce website for selling the garment, among others. In other embodiments, the pixels of the garment from the source image may be altered for various reasons. For example, a user of the client computing device 102 may input a preference for synthetic bodies of a different size than what the source image of the garment depicts. For example, the source image of the garment could be in a medium size, but the user preference is for the garment to be shown in an extra-large size with an appropriate synthetic body generated to fill that extra-large size, which may include expanding the shape of the garment or otherwise modifying the garment pixels relative to the corresponding garment pixels in the source image.

Figure 4:
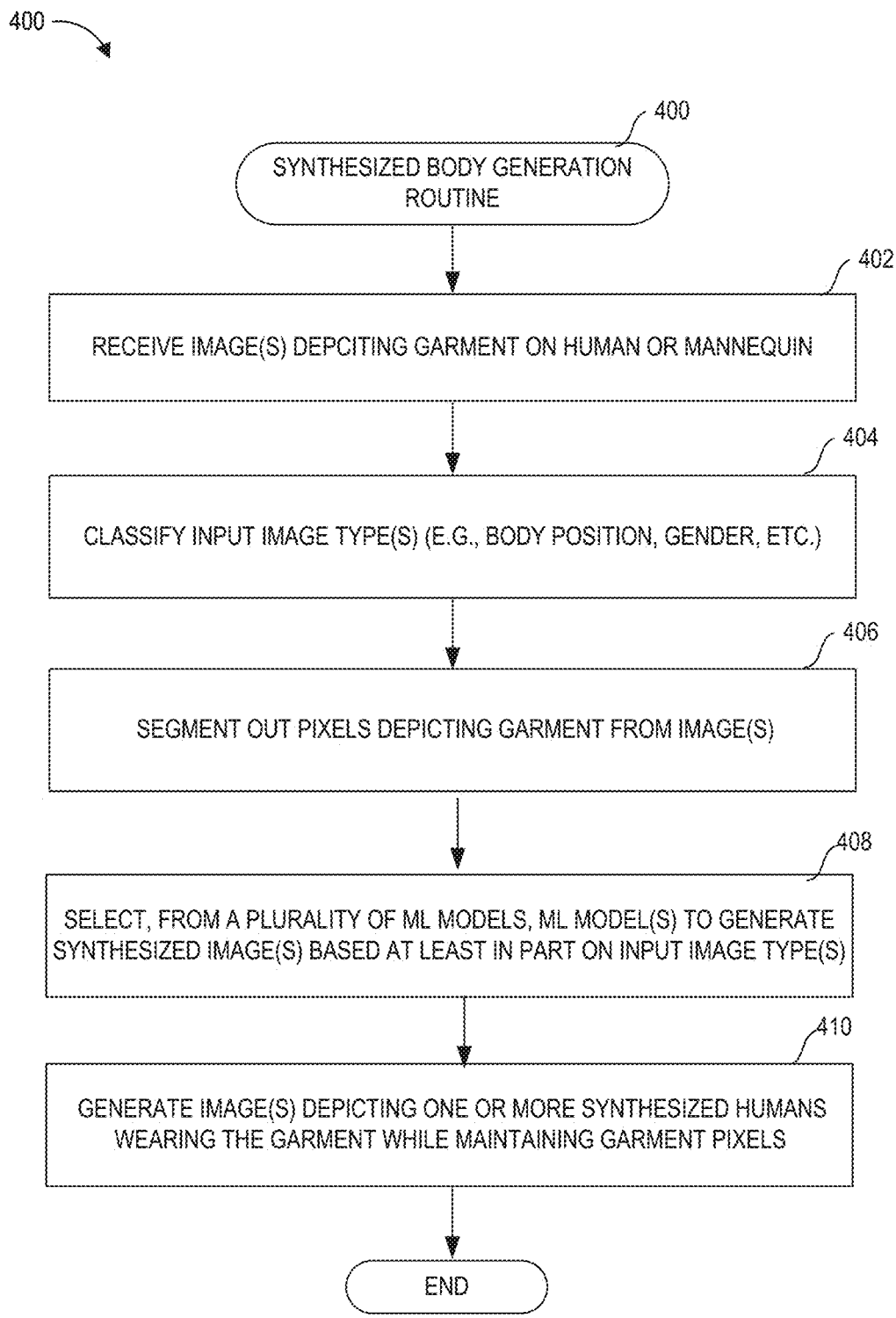
FIG. 4 is a flow chart depicting an illustrative routine implemented by the synthesized human generation system for generating one or more images of synthetic bodies wearing a garment, according to some embodiments.

FIG. 4 is a flow chart depicting an illustrative routine 400 implemented by the synthesized human generation system 120 for generating images of synthetic bodies wearing a garment, according to some embodiments. The routine 400 may be implemented by the synthesized human generation system 120, but other components of FIG. 1, such as the ML models 170 (and/or a combination of the other components of the synthesized human generation system 120), may perform some operations referenced within the routine 400 for or on behalf synthesized human generation system 120. In at least one embodiment, the synthesized human generation system 120 may implement all or portions of the routine 400.

The illustrative method begins at block 402, where the synthesized human generation system 120 receives one or more source images depicting a human or mannequin wearing a garment. The source image(s) may have been sent from the client computing device 102 with user preferences of how the output of generated synthetic bodies should appear (e.g., skin tone, hair type, hair color, facial features, etc.). As disclosed herein, the image(s) may depict the human or mannequin wearing the garment in multiple body orientations or body types (e.g., side facing, waist to toe, woman). However, in other embodiments, only a single input image may be provided.

Next, at block 404, the synthesized human generation system 120 receives the source image(s) and utilizes the classifier 130 to classify each source image. For example, the classifier 130 may classify a source image as a body type or orientation of a front facing, neck to toe, woman. As another example, the classifier 130 may classify a source image as a body type or orientation of a side facing, neck to knee, man. As yet another example, the classifier 130 may classify a source image as a body type or orientation of a back facing, neck to waist, man.

At block 406, the synthesized human generation system 120 provides the source image(s) to the image segmentation component 140 for segmentation. The image segmentation component 140 may segment out the garment pixels from the source image(s). As described above, segmenting the garment pixels from the source image(s) may result in the garment appearing similar if not identical in the source image(s) and the segmented garment appearing to be worn by a synthesized body generated by the ML models 170. However, as stated herein, the pixels of a garment from the source image(s) may be modified to satisfy user inputs or preferences (e.g., requesting a different size for the garment than what is depicted in the source image).

At block 408, the synthesized human generation system 120 provides the segmented garment and the classification to the model selection component 160. The model selection component 160 determines which models of the ML models 170 should be utilized to generate image(s) of synthesized bodies wearing the garment (e.g., an ML model that generates a front facing woman from the neck to toe to fit the shape of a garment).

At block 410, the synthesized human generation system 120 utilizes the selected ML models 170 and generates one or more images of one or more synthesized bodies wearing the garment. The ML models 170 may utilize the classifications from 404 and the segmented garment from 406 to generate the image(s) of synthesized bodies wearing the garment. As described herein, the image(s) generated can be displayed or published on a website (e.g., to be sold) replacing real professional models with the synthesized bodies. In some embodiments, the user that captured the original photograph or another user (such as a graphic designer, visual artist, administrative user, etc.) may be prompted to select which of the output images to publish, and/or may be prompted to manually "touch up" or otherwise modify the images prior to publication to an electronic catalog or other destination.

Accordingly, by implementation of the routine 400, the synthesized human generation system 120 may generate professional looking image(s) of synthetic bodies wearing a garment, avoiding need for hiring professional human models to wear the garment and hiring a photographer to photograph the professional human models wearing the garment.

While FIG. 4 is described with reference to synthesized human generation system 120, in some embodiments the routine 400 may be implemented in whole or in part by another device, such as a client computing device 102.

Figure 5:
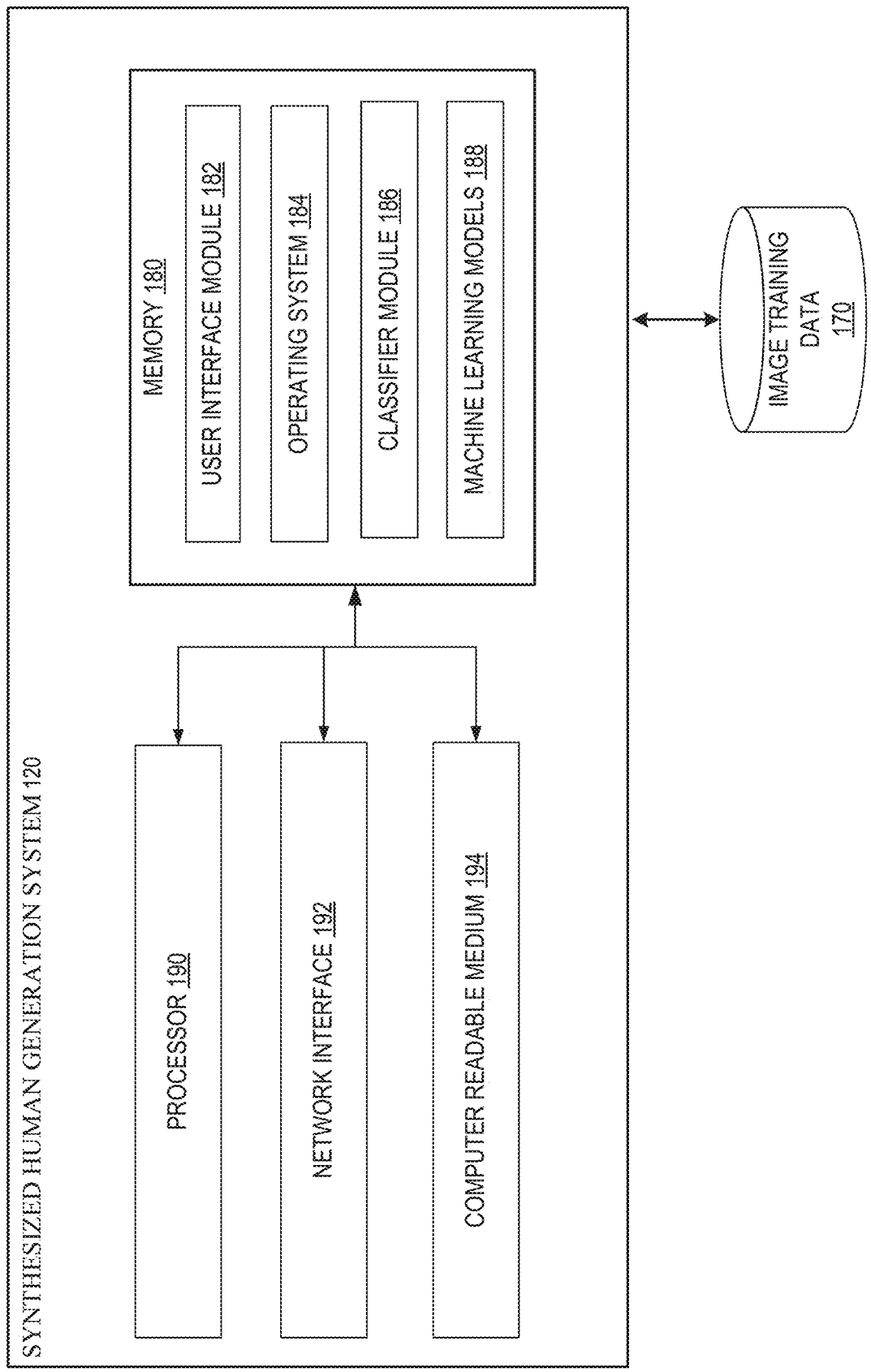
FIG. 5 depicts a general architecture of a computing device configured to implement aspects of the present disclosure.

FIG. 5 depicts an example architecture of a computing system (referred to as the synthesized human generation system 120) that can be used to perform one or more of the techniques described herein or illustrated in FIGS. 1-4. The general architecture of the synthesized human generation system 120 depicted in FIG. 5 includes an arrangement of computer hardware and software modules that may be used to implement one or more aspects of the present disclosure. The synthesized human generation system 120 may include many more (or fewer) elements than those shown in FIG. 5. It is not necessary, however, that all of these elements be shown in order to provide an enabling disclosure. As illustrated, the synthesized human generation system 120 includes a processor 190, a network interface 192, and a computer readable medium 194, all of which may communicate with one another by way of a communication bus. The network interface 192 may provide connectivity to one or more networks or computing systems. The processor 190 may thus receive information and instructions from other computing systems or services via the network 110 illustrated in FIG. 1.

The processor 190 may also communicate with memory 180. The memory 180 may contain computer program instructions (grouped as modules or units in some embodiments) that the processor 190 executes in order to implement one or more aspects of the present disclosure. The memory 180 may include random access memory (RAM), read only memory (ROM), and/or other persistent, auxiliary, or non transitory computer readable media. The memory 180 may store an operating system 184 that provides computer program instructions for use by the processor 190 in the general administration and operation of the polygonal outline image generation system 120. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device, e.g., via a navigation and/or browsing interface such as a browser or application installed on the user computing device.

In addition to and/or in combination with the user interface module 182, the memory 180 includes a classifier module 186 and machine learning models 188. In one embodiment, the synthesized human generation system 120 when executed implements various aspects of the present disclosure, e.g., generating synthesized human bodies for a garment, and/or other aspects discussed herein or illustrated in FIGS. 1-4. Illustratively, the synthesized human generation system 120 may include code corresponding to the classifier module 186 and the machine learning models 188, and training data in image training data store 160.

While the classifier module 186 and the ML models 188 are shown in FIG. 5 as part of the synthesized human generation system 120, in other embodiments, all or a portion of the classifier module 186 and the ML models 188 may be implemented by another computing device. For example, in certain embodiments of the present disclosure, another computing device in communication with the synthesized human generation system 120 may include several modules or components that operate similarly to the modules and components illustrated as part of the synthesized human generation system 120. In some instances, the classifier module 186 and the ML models 188 may be implemented as one or more virtualized computing devices. Moreover, the classifier module 186 and the ML modules 188 may be implemented in whole or part as a distributed computing system including a collection of devices that collectively implement the functions discussed herein.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for generating images of a synthesized human body wearing a garment, the system comprising:
   a memory configured to store specific computer-executable instructions; and
   a processor in communication with the memory and configured to execute the specific computer-executable instructions to at least:

receive a first image, wherein the first image comprises a photograph depicting a human or mannequin wearing the garment;

classify, using an image classifying machine learning model, one or more human body orientations depicted in the first image;

apply segmentation to the first image to generate a second image, the second image comprising pixels depicting the garment from the first image and excluding a plurality of pixels depicting the human or mannequin from the first image;

select, from among a plurality of body generation machine learning models, at least one body generation machine learning model based at least in part on the classified one or more human body orientations depicted in the first image; and generate, using the at least one body generation machine learning model when provided with the second image as input, one or more generated images depicting a synthesized human wearing the garment, wherein the one or more generated images include the pixels of the second image depicting the garment.

2. The system of claim 1, wherein the image classifying machine learning model is trained to identify a body orientation of a mannequin or human in an image.

3. The system of claim 1, wherein the one or more human body orientations comprise at least one of a front facing orientation, a back facing orientation, or a side facing orientation.

4. A computer-implemented method comprising:
receiving a first image, wherein the first image depicts a human or mannequin wearing a garment;
determine a classification of the first image using an image classifier;
applying segmentation to the first image to generate a second image, the second image comprising pixels depicting the garment from the first image;
selecting, from among a plurality of body generation machine learning models, at least one body generation machine learning model based at least in part on the classification of the first image; and
generating, using the at least one body generation machine learning model when provided with the second image as input, one or more generated images depicting a synthesized human wearing the garment.

5. The computer-implemented method of claim 4, wherein the one or more generated images depicting a synthesized human wearing the garment are generated based at least in part on user input.

6. The computer-implemented method of claim 5, wherein the user input comprises a selection of at least one of a skin tone, hair type, hair color, or facial hair.

7. The computer-implemented method of claim 5, wherein the user input comprises a selection of body build to be depicted in the one or more generated images, wherein the body build to be depicted differs from a body build of the human or mannequin depicted in the first image.

8. The computer-implemented method of claim 4, further comprising publishing the one or more generated images depicting a synthesized human wearing the garment to an electronic catalog in association with a listing for the garment.

9. The computer-implemented method of claim 4, wherein the image classifier is a machine learning model trained to identify a body orientation of a mannequin or human in an image.

10. The computer-implemented method of claim 4 further comprising training two or more of the plurality of body generation machine learning models, wherein a first model of the plurality of body generation machine learning models is trained using training images depicting clothed humans of a first classification, wherein the second model of the plurality of body generation machine learning models is trained using training images depicting clothed humans of a second classification.

11. The computer-implemented method of claim 10, wherein the image classifier is trained to identify at least whether an input image falls within the first classification or the second classification.

12. The computer-implemented method of claim 10, wherein the classification determined results in one or more human body orientations depicted in the first image.

13. The computer-implemented method of claim 12, wherein the one or more human body orientations comprise at least one of a front facing orientation, a back facing orientation, or a side facing orientation.

14. A non-transitory computer-readable medium storing specific computer-executable instructions that, when executed by a processor, cause the processor to at least:
receive a first image, wherein the first image depicts a human or mannequin wearing a garment;
determine visual attributes regarding the first image using an image classifier;
apply segmentation to the first image to generate a second image, the second image comprising pixels depicting the garment from the first image;
select, from among a plurality of body generation machine learning models, at least one body generation machine learning model based at least in part on the visual attributes regarding the first image; and
generate, using the at least one body generation machine learning model when provided with the second image as input, one or more generated images depicting a synthesized human wearing the garment.

15. The non-transitory computer-readable medium of claim 14, wherein the plurality of body generation machine learning models includes a generative adversarial network (GAN) model.

16. The non-transitory computer-readable medium of claim 15, wherein the GAN model comprises (a) a generator that is trained to generate an output image from a photograph of a garment and (b) a discriminator that is trained to determine whether the generated output image appears to be a real image of a clothed human.

17. The non-transitory computer-readable medium of claim 15, wherein the GAN model comprises a generator that is trained to generate an image of a clothed human from an input image in which pixels depicting a garment in a photograph have been segmented from other pixels of the photograph.

18. The non-transitory computer-readable medium of claim 14, wherein the plurality of body generation machine learning models include a diffusion model.

19. The non-transitory computer-readable medium of claim 18, wherein the diffusion model comprises a first encoder and a second encoder, and wherein the first encoder is trained to generate garment features from a garment image and the second encoder is trained to generate latent space of a garment identified in the garment image.

20. The non-transitory computer-readable medium of claim 19, wherein the diffusion model is further trained to generate image data depicting a synthesized body within the latent space.

* * * * *